F. W. CAPPELEN.
HEADLIGHT SHADE.
APPLICATION FILED OCT. 16, 1916.

1,353,890.                                      Patented Sept. 28, 1920.

WITNESSES
M. R. McInnis
G. E. Sorensen

INVENTOR
FREDERICK W. CAPPELEN
BY Paul & Paul
ATTORNEYS

UNITED STATES PATENT OFFICE.

FREDERICK W. CAPPELEN, OF MINNEAPOLIS, MINNESOTA.

HEADLIGHT-SHADE.

1,353,890.   Specification of Letters Patent.   Patented Sept. 28, 1920.

Application filed October 16, 1916.   Serial No. 125,889.

*To all whom it may concern:*

Be it known that I, FREDERICK W. CAPPELEN, a citizen of the United States, resident of Minneapolis, county of Hennepin, State of Minnesota, have invented certain new and useful Improvements in Headlight-Shades, of which the following is a specification.

In the operation of an automobile or other power propelled vehicle using a headlight, the driver has found it difficult to pass another machine having similar lights owing to the glare of the approaching light thrown directly in the face of the driver. This is due to the fact that the rays of the headlight are thrown forward in all directions, both up and down, and toward each side. Headlight dimmers operating on a horizontal axis have been used and lenses with opaque upper sections have also been devised for the purpose of obscuring the upper portion of the light with a view of throwing the rays downwardly upon the road. This does not entirely answer the purpose for the reason that obscuring the upper section of the lens does not prevent the rays of light from being thrown toward an approaching car and frequently into the face of the driver.

The object, therefore, of my invention is to provide a shade which will obscure a vertical section of the lens on the side thereof adjacent to the approaching car so that the rays will be thrown outwardly toward the ditch rather than toward the middle of the road and the approaching car, and thereby the drivers of passing cars can readily see each other and easily avoid a collision, while the headlights of both cars will enable the drivers to accurately determine the width of the road and how near the ditch the cars can travel with safety.

A further object is to provide a shade capable of application to any style of headlight and easily controlled from the driver's seat.

The invention consists generally in various constructions and combinations, all as hereinafter described and particularly pointed out in the claim.

Figure 1:
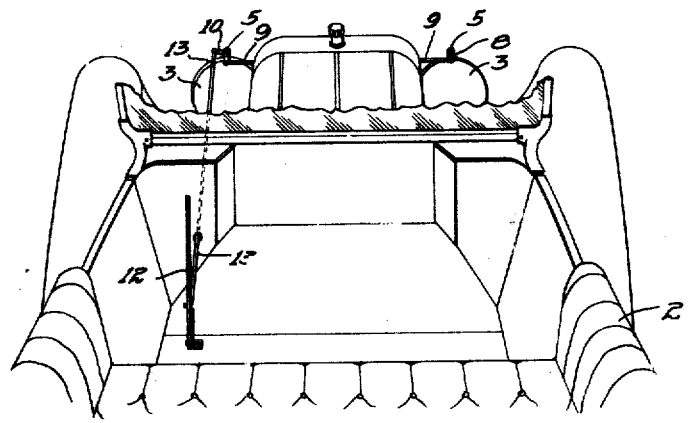
Figure 2:
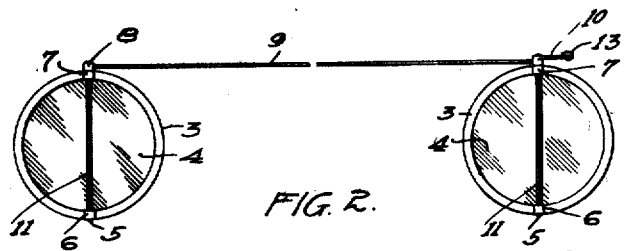
Figure 3:
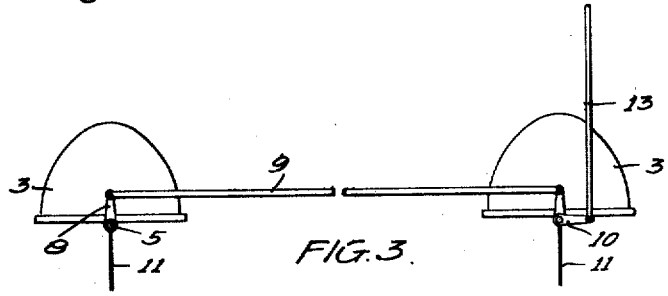
Figures 4, 5:
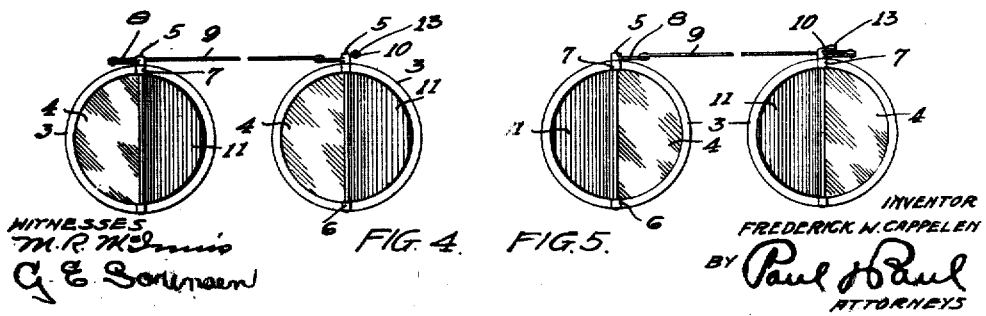

In the accompanying drawings forming part of this specification,

Figure 1 is a perspective view of the forward portion of an automobile, illustrating my improved shade mounted on the headlights, with the means for operating the shade from the driver's seat, Fig. 2 is a front view of the headlights, Fig. 3 is a plan view of the same, Figs. 4 and 5 are detail views, showing the shades swung to cover the right and left hand vertical sections of the lens, as may be desired.

In the drawing, 2 represents an automobile of ordinary construction, having headlights 3 provided with lenses 4. 5 is a spindle mounted in vertical bearings 6 and 7 on the frame of the lens. One of the spindles has an arm 8 thereon, connected by a rod 9 with a similar arm of a bell crank 10 that is secured to the other spindle, so that when the bell crank is rocked a corresponding movement will be imparted to the spindles. Each spindle is provided with a shade 11 of suitable opaque material, the shade being segmental in form, or substantially semicircular, covering one-half of the lens and centrally mounted thereon to swing in either direction and conceal the lens on either side of its vertically arranged spindle. A lever 12 is mounted within convenient reach of the driver and a rod 13 connects the lever with the remaining arm of the bell crank 10. The shades when not in use will be adjusted in the position shown in Fig. 3 at right angles substantially to the surfaces of the lens. This will be the usual position when the car is running on a country road at night. Upon approaching another car and turning to the right, as usual in passing, the driver will swing the shades to conceal that portion of each lens on the side adjacent to the approaching car and thereby cut off entirely the glare of the headlight upon the approaching car and the driver. The other half of the lens, being unobscured, will direct the rays of light to the right hand side of the car upon the road and in the ditch and enable the driver to easily determine the position of the ditch and how far he can safely turn out in passing the other car. The other car, being similarly equipped, the driver will operate his shades to shut off the left hand side of the lens and direct the rays of his headlight to the right in a similar manner. As soon as the cars have passed, the shades may be swung back to their normal position, exposing substantially the full surface of the lens.

Drivers of approaching cars often shut off the lights entirely in passing one another, but with my improvement this is unnecessary, as the shades may be swung to cover or conceal the left hand vertical section of the lens and thereby the headlight rays of one car cannot be thrown in the face of the driver of the other car.

I claim as my invention:

The combination, with a vehicle headlight, of semi-circular shades mounted to swing on vertical axes in front of the headlight lens to obscure a semi-circular portion of the lens upon either side of the vertical axis thereof, means connecting said shades for simultaneous movement to obscure a portion of the lenses on the same side of the vehicle, said shades swinging to a point close to the lens and in a plane parallel therewith upon either side of the vertical axis of the lens and wholly obscuring the rays of light from both lenses on the same side, whereby the space in front to the right or the left side of the vehicle is darkened and the glare of light in the face of a driver approaching is prevented.

In witness whereof, I have hereunto set my hand this 6th day of October 1916.

FREDERICK W. CAPPELEN.